(12) United States Patent
Sarkar et al.

(10) Patent No.: US 10,567,720 B2
(45) Date of Patent: Feb. 18, 2020

(54) COLOR CONVERSION FOR AMBIENT-ADAPTIVE DIGITAL CONTENT

(71) Applicant: Microsoft Technology Licensing, LLC, Redmond, WA (US)

(72) Inventors: Abhijit Sarkar, Woodinville, WA (US); Zhenhuan Wen, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/043,017

(22) Filed: Jul. 23, 2018

(65) Prior Publication Data

US 2020/0029061 A1 Jan. 23, 2020

(51) Int. Cl.
| | |
|---|---|
| *H04N 7/14* | (2006.01) |
| *H04N 9/73* | (2006.01) |
| *H04N 9/77* | (2006.01) |
| *H04N 5/44* | (2011.01) |
| *G06T 7/90* | (2017.01) |

(52) U.S. Cl.
CPC ............ *H04N 9/73* (2013.01); *H04N 5/4403* (2013.01); *H04N 7/147* (2013.01); *H04N 9/77* (2013.01); *G06T 7/90* (2017.01)

(58) Field of Classification Search
USPC ..................... 348/14.01, 14.02, 14.08, 14.09
See application file for complete search history.

(56) References Cited

U.S. PATENT DOCUMENTS

| | | | |
|---|---|---|---|
| 6,980,697 B1* | 12/2005 | Basso | ..................... G06T 15/50 |
| | | | 348/14.01 |
| 8,836,716 B1 | 9/2014 | Gaddy et al. | |
| 9,432,612 B2 | 8/2016 | Bruhn et al. | |
| 2008/0240558 A1 | 10/2008 | Li et al. | |
| 2011/0050695 A1 | 3/2011 | Sullivan et al. | |

(Continued)

OTHER PUBLICATIONS

Senfar, Wen, "Color management for future video Systems", In Proceedings of the IEEE, vol. 101, Issue 1, Jan. 2013, pp. 31-44.

*Primary Examiner* — Quoc D Tran
(74) *Attorney, Agent, or Firm* — Alleman Hall Creasman & Tuttle LLP

(57) ABSTRACT

A method for digital image color conversion includes, at a first computing device, capturing a first digital image of a first real-world environment. Based on ambient lighting conditions of the first real-world environment, a first ambient lighting-agnostic digital image is generated using a capture-side ambient lighting color conversion. The first ambient lighting-agnostic digital image is transmitted to a second computing device in a second real-world environment. From the second computing device, a second ambient lighting-agnostic digital image is received, the second image having been generated by the second computing device from a second digital image using the capture-side ambient lighting color conversion. Based on the ambient lighting conditions of the first real-world environment, a lighting-corrected digital image is generated from the second ambient lighting-agnostic digital image using a display-side ambient lighting color conversion. The lighting-corrected digital image is displayed on the first computing device.

20 Claims, 10 Drawing Sheets

(56) References Cited

U.S. PATENT DOCUMENTS

| | | | |
|---|---|---|---|
| 2011/0117955 A1* | 5/2011 | Lee | H04M 1/72569 |
| | | | 455/550.1 |
| 2012/0086815 A1* | 4/2012 | Cooper | H04N 7/15 |
| | | | 348/207.1 |
| 2012/0201456 A1 | 8/2012 | El-mahdy et al. | |
| 2013/0176326 A1* | 7/2013 | Safaee-Rad | G06T 11/001 |
| | | | 345/590 |
| 2013/0308045 A1 | 11/2013 | Rhoads et al. | |
| 2013/0342637 A1* | 12/2013 | Felkai | H04N 7/14 |
| | | | 348/14.08 |
| 2014/0292997 A1* | 10/2014 | Hung | H04N 9/735 |
| | | | 348/14.01 |
| 2014/0362159 A1* | 12/2014 | Zhai | H04N 19/117 |
| | | | 348/14.01 |
| 2015/0035440 A1 | 2/2015 | Spero | |
| 2016/0174690 A1 | 6/2016 | Howell et al. | |
| 2016/0358584 A1 | 12/2016 | Greenebaum et al. | |
| 2016/0366444 A1* | 12/2016 | Sullivan | H04N 19/70 |
| 2017/0279866 A1 | 9/2017 | Bertrand et al. | |
| 2018/0060994 A1 | 3/2018 | Woo | |

* cited by examiner

COLOR CONVERSION FOR AMBIENT-ADAPTIVE DIGITAL CONTENT

BACKGROUND

The ambient lighting conditions of an environment can affect how colors are represented in any images taken of the environment. Ambient lighting conditions can also affect how colors of an image are perceived when the image is displayed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for digital image color conversion includes, at a first computing device, capturing a first digital image of a first real-world environment. Based on ambient lighting conditions of the first real-world environment, a first ambient lighting-agnostic digital image is generated from the first digital image using a capture-side ambient lighting color conversion. The first ambient lighting-agnostic digital image is transmitted to a second computing device in a second real-world environment. From the second computing device, a second ambient lighting-agnostic digital image is received, the second image having been generated by the second computing device from a second digital image using the capture-side ambient lighting color conversion. Based on the ambient lighting conditions, a lighting-corrected digital image is generated from the second ambient lighting-agnostic digital image using a display-side ambient lighting color conversion. The lighting-corrected digital image is displayed on the first computing device.

DETAILED DESCRIPTION

Figure 1:
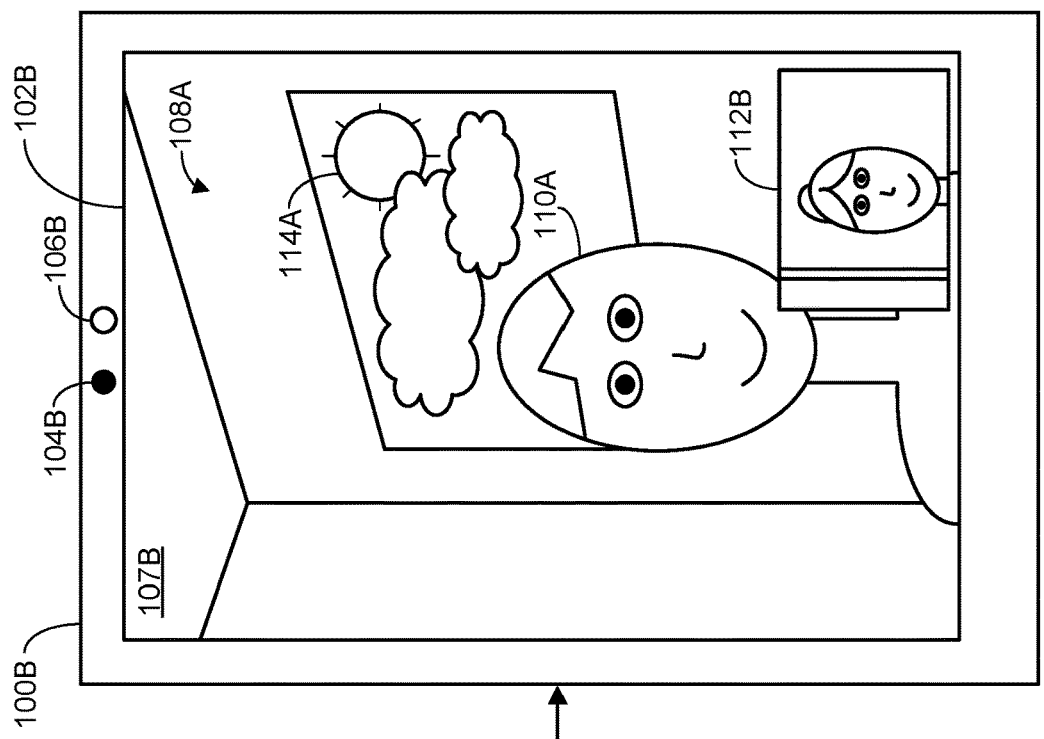
FIG. 1 schematically shows two example computing devices exchanging digital imagery.
Figure 1:
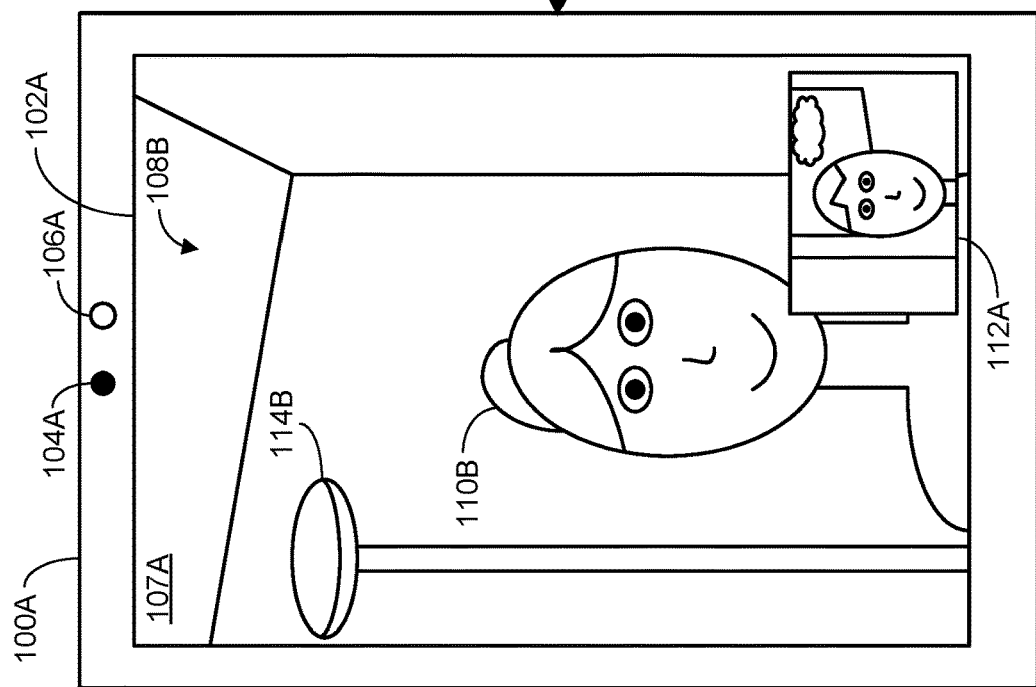

Ambient lighting conditions of an environment will have an effect on any images taken within the environment, particularly with regard to color reproduction. An apple photographed under typical daylight conditions will have a noticeably different appearance in the photo when compared to the same apple photographed under incandescent lighting, fluorescent lighting, etc., at least partially because different lighting sources tend to have different ambient color profiles. Many digital cameras use various image processing techniques, such as auto white balance, to attempt to correct for the ambient lighting conditions in an environment. Accordingly, the resulting digital images may not exactly reproduce the colors in the environment as perceived by the photographer. In many cases the resulting images are artificially modified such that the depicted environments appear to be lit under a predefined lighting condition, such as typical daylight, or to account for subjective preferences (e.g., for a specific user).

This has ramifications for preserving perceptual color accuracy in digital images, particularly when the digital images are viewed under different lighting conditions from where they were taken. Here, achieving perceptual (or perceived) color accuracy involves rendering colors on a display to visually match the colors in the original scene under a given ambient lighting condition. In other words, if the original scene is under one ambient lighting condition and the display reproducing the scene is in a different ambient lighting condition, appearance of various colors in the scene in relation to respective scene white points should be preserved. Perceptual color accuracy is different from the general term "color accuracy" in that color accuracy is colorimetrically computed using reference colors in a standard color space, for example, sRGB, DCI-P3, or Adobe RGB, which have a specific white point, and thus color accuracy is measured or computed with respect to that white point. Perceptual color accuracy, in contrast, takes into account the viewing conditions, for example ambient color and brightness, and uses aspects of color appearance modeling to predict how colors appear to a user under a given ambient lighting condition.

As an example, two different computing devices may exchange digital imagery as part of a live video call between two friends. As each device captures digital images, auto white balance or similar techniques will be used to account for each device's respective ambient lighting conditions before the captured images are sent. Thus, when one friend views a digital image received from the other friend's device, their perception of the digital image will be affected both by any image processing performed by the friend's device, as well as their own local ambient lighting. As a result, the colors that one friend perceives when looking at an image may differ significantly from the colors their friend perceived when the image was taken. In other words, perceptual color accuracy is not preserved between the two devices in this scenario.

The present disclosure therefore describes a technique for digital image color conversion aimed at preserving perceptual color accuracy independent of ambient lighting conditions. After capturing a digital image, a computing device determines ambient lighting conditions of its own real-world environment and uses a capture-side ambient lighting color conversion to generate an ambient lighting-agnostic digital image. The ambient lighting-agnostic digital image may depict the real-world environment as if under a predefined lighting condition, such as daylight, as opposed to the actual lighting conditions of the environment. The ambient lighting-agnostic digital image may then be stored for later display and/or transmitted to another device. In anticipation of displaying an ambient lighting-agnostic digital image, the device may generate a lighting-corrected digital image that accounts for how local ambient lighting conditions will affect perception of colors in the image. In an example scenario, the lighting-corrected digital image may be generated for the display such that its colors are perceived as being similar to how the colors actually appeared to the photographer when the original digital image was taken. Thus, the herein-described technique may help to preserve perceptual color accuracy in digital images regardless of environmental ambient lighting at time of capture or time of display.

The digital image color conversion techniques are primarily described herein with respect to two devices exchanging digital images over a network. In other words, a digital image taken by one device is ultimately displayed on another device, and ambient lighting conditions in two different environments are accounted for. However, digital image color conversion may be applied in the context of any number of devices, including more than two devices in communication, or a single device. For instance, a digital camera may be used to capture an image in a first environment, while the image is viewed in a second environment, and thus two different sets of ambient lighting conditions may be accounted for.

FIG. 1 schematically illustrates exchange of digital images between two example computing devices 100A and 100B. In FIG. 1, these devices are mobile devices each including integrated displays 102A/102B and camera hardware 104A/104B. Furthermore, each device includes an ambient color sensor 106A/106B. However, ambient lighting color conversion may be performed on any suitable computing device having any suitable hardware. Such a device need not include an integrated camera, ambient color sensor, or display (e.g., a digital image may be taken by another device and transmitted for processing and/or display). As examples, digital image color conversion may be performed on laptops, desktops, smartphones, tablets, digital cameras, virtual/augmented/mixed reality display devices, servers, wearable devices, media centers, etc. Digital image color conversion may be implemented on computing system 1000 described below with respect to FIG. 10.

Devices 100A and 100B are exchanging digital imagery in the context of a live video call. Specifically, devices 100A and 100B are each displaying a digital image 107A/107B, each digital image depicting a different real-world environment 108A/108B. A user 110B is pictured in image 107A on device 100A, the user being present in environment 108B. Similarly, a user 110A is shown in image 107B on device 100B, user 110A being present in environment 108A. In other words, in FIG. 1, computing device 100A is present in real-world environment 108A, but shows an image 107A captured by device 100B in real-world environment 108B. Similarly, the image 107B shown by device 100B is captured by camera 104A of computing device 100A.

However, each device is also displaying a supplementary image 112A/112B depicting the device's own real-world environment. Device 100A is displaying image 112A that depicts user 110A, the device's owner, within real-world environment 108A, while device 100B displays image 112B. In other words, each computing device captures an image of its own real-world environment. These images are both displayed on the capture-side device (i.e., as images 112A and 112B) and transmitted for remote display on the other device (i.e., as images 107A and 107B).

In FIG. 1, the smaller images 112A/112B displayed by each device show content captured locally by that device, while the larger images 107A/107B are received from the opposite device, and include content captured by the opposite device. However, in some examples, received images 107A and 107B may be displayed smaller than the locally-captured images 112A and 112B. Furthermore, each device may display additional images, for example received from additional devices, and/or only display a single image at once.

Each real-world environment 108A/108B includes a lighting source 114A/114B, respectively. Specifically, environment 108B includes a lighting source 114B taking the form of a lamp, while environment 108A includes an open window allowing in light from the sun 114A. As a result, each of environments 108A and 108B will have different ambient lighting conditions. Environment 108B will have relatively warm-colored lighting consistent with typical home lighting, while environment 108A will be closer to neutral-cool lighting under typical daylight conditions.

As discussed above, the different ambient lighting conditions in the real-world environments of the two devices will affect how the digital images are captured and displayed. For example, as device 100B takes a digital image of user 110B, the device may perform auto white balance and/or similar image processing to account for the relatively warmer lighting in environment 108B. As a result, user 110A may perceive colors in image 107A as being cooler than they appear to user 110B within real-world environment 108B. This may be undesirable in various scenarios in which perceived color accuracy is important, such as if user 110B is asking user 110A for his thoughts on the color of a new article of clothing, or a new paint color in environment 108B.

Figure 2:
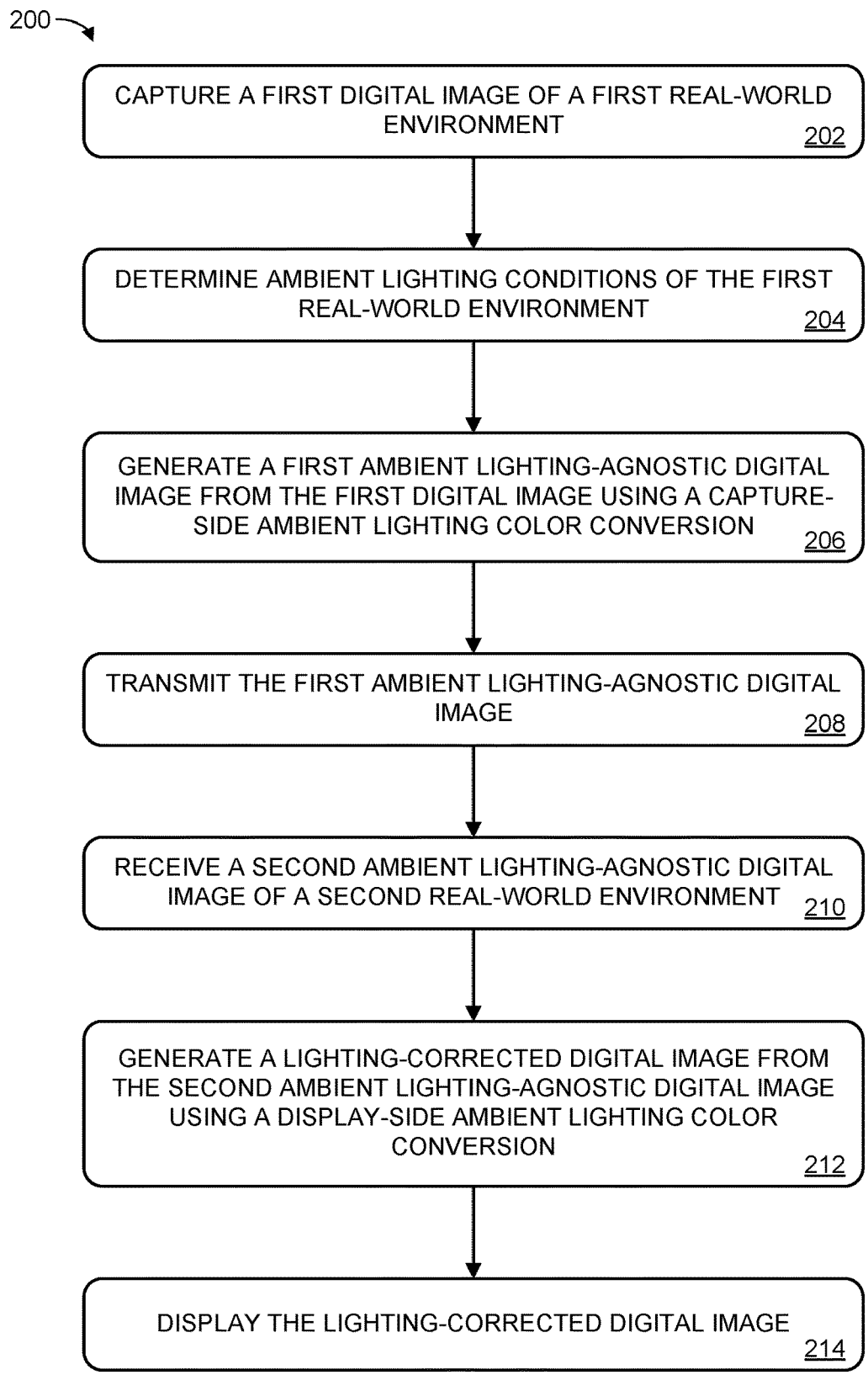
FIG. 2 illustrates an example method for digital image color conversion.

Accordingly, FIG. 2 illustrates an example method 200 for digital image color conversion. Method 200 contemplates a scenario in which two devices, a first computing device and second computing device, are exchanging digital imagery over a network. However, steps in method 200 are all performed by the first computing device. As a result, similar or equivalent steps may in some cases be performed by the second computing device. Method 200 may be performed by either or both of devices 100A and 100B, computing system 1000 of FIG. 10, and/or any other suitable computer hardware.

At 202, method 200 includes capturing a first digital image of a first real-world environment. Capturing of a digital image may be done with any suitable camera or other imaging hardware. Such imaging hardware need not be integrated within or attached to the computing device that implements method 200. Rather, the device may optionally communicate with an external camera to retrieve the captured digital image, and/or retrieve the captured digital image from another suitable source.

Figure 3:
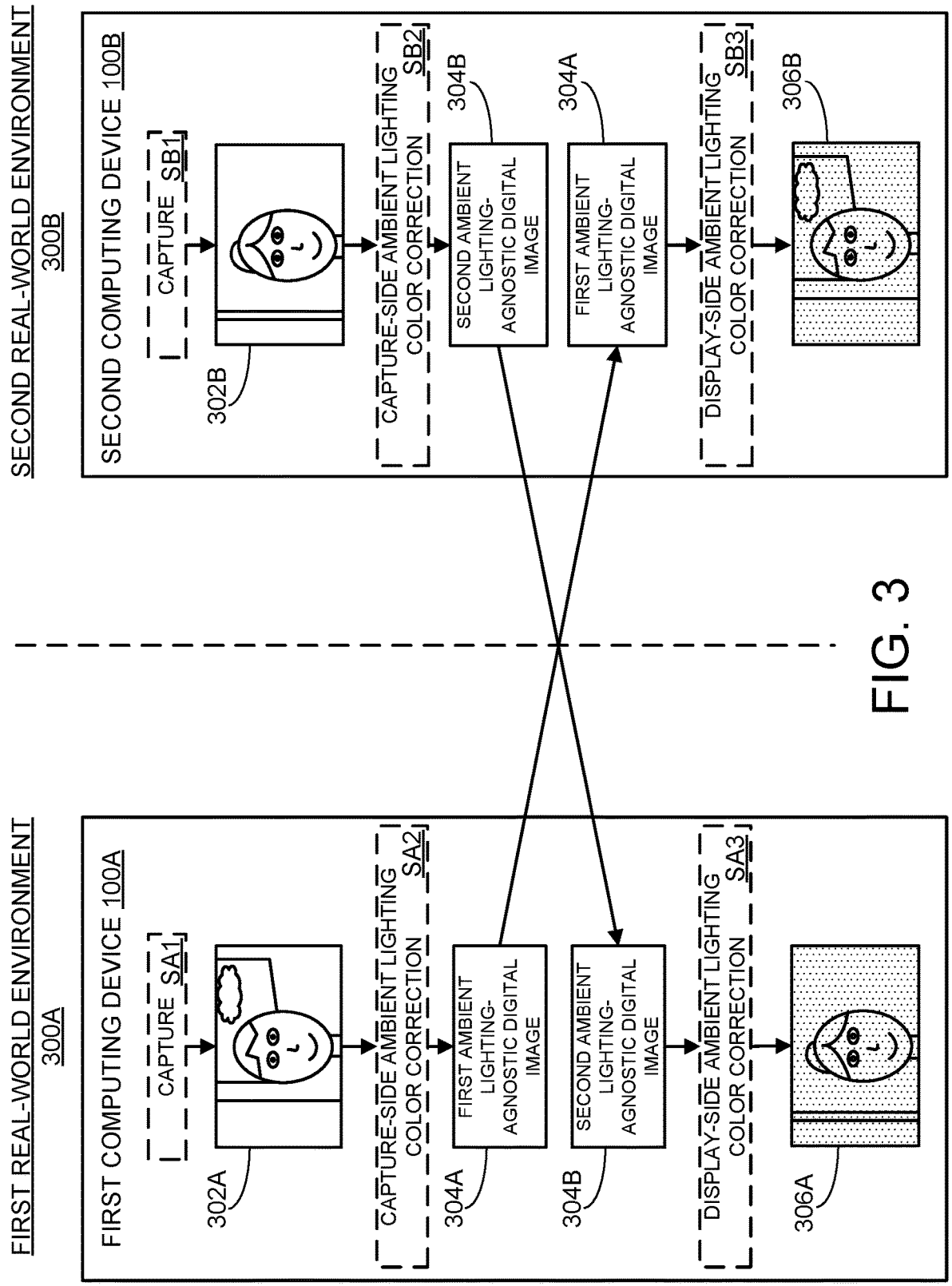
FIG. 3 illustrates exchange and color conversion of digital images by computing devices in separate real-world environments.

FIG. 3 schematically illustrates color conversion of digital images in the context of bidirectional communication between two computing devices. Depicted steps are divided between a first real-world environment 300A and a second real-world environment 300B. For the sake of simplicity, steps shown as taking place within first real-world environment 300A are performed by computing device 100A of FIG. 1, while steps performed in second real-world environment 300B are performed by second computing device 100B of FIG. 1. However, the depicted steps may be divided between any suitable number of computing devices. In first real-world environment 300A, at step SA1, computing device 100A captures a first digital image 302A. Similarly, in second real-world environment 300B, at step SB1 second computing device 100B captures a second digital image 302B.

Returning to FIG. 2, at 204, method 200 includes determining ambient lighting conditions of the first real-world environment. In some examples, ambient lighting conditions of an environment may be determined using an ambient color sensor of a computing device, such as ambient color sensors 106A and 106B shown in FIG. 1. Additionally, or alternatively, ambient lighting conditions of an environment may be determined in other suitable ways. For example, ambient lighting conditions of an environment may be inferred from pixel values of a captured digital image. This may be done, for instance, when auto white balance is performed by identifying an object within the environment that is presumed to be white, and determining how the apparent color of the white object differs from true white. This difference may be inferred to result from the ambient color temperature within the environment.

At 206, method 200 includes, based on the ambient lighting conditions of the first real-world environment, generating a first ambient lighting-agnostic digital image from the first digital image using a capture-side ambient lighting color conversion. In other words, various image processing techniques and algorithms may be used to adjust how colors appear in the digital image to account for the lighting conditions under which the image was captured. Additional details regarding ambient lighting color conversions will be given below with respect to FIGS. 6 and 7.

In some examples, the capture-side ambient lighting color conversion is configured to convert colors of the digital image to appear as if the digital image was captured under a predefined lighting condition. The predefined lighting condition may, for example, be an ambient color temperature of 6500K (D65), which is similar to lighting observed under typical daylight conditions. In other words, regardless of the ambient lighting conditions present when the digital image was taken, the ambient lighting-agnostic digital image should appear as if the environment was illuminated by typical daylight. However, the predefined lighting condition may be any suitable ambient color profile depending on the implementation and user preference.

Generation of an ambient lighting-agnostic digital image is schematically illustrated in FIG. 3. As shown at step SA2, a capture-side ambient lighting color conversion is used to generate a first ambient lighting-agnostic digital image 304A from first digital image 302A. Similarly, in second real-world environment 300B, a second ambient lighting-agnostic digital image 304B is generated from second digital image 302B with another capture-side ambient lighting color conversion SB2.

Returning briefly to FIG. 2, at 208, method 200 includes transmitting the first ambient lighting-agnostic digital image to a second computing device at a second real-world environment. At 210, method 200 includes receiving a second ambient lighting-agnostic digital image of the second real-world environment from the second computing device. Similar to the first ambient lighting-agnostic digital image, the second ambient lighting-agnostic digital image is generated by the second computing device from the second digital image using the capture-side ambient lighting color conversion. In other words, the second digital image may be an original image captured by the second computing device, and from which the second ambient lighting-agnostic digital image is generated. In some cases the digital image transmitted from one device to another may be an original captured image (e.g., a substantially unmodified image) in addition to, or instead of, an ambient lighting-agnostic digital image.

Digital image transmission and receipt is schematically illustrated in FIG. 3, in which first ambient lighting-agnostic digital image 304A is transmitted from first computing device 100A to second computing device 100B in second real-world environment 300B. Similarly, second ambient lighting-agnostic digital image 304B is received by first computing device 100A from second computing device 100B.

Digital images may be transmitted and received in any suitable way. For example, digital images may be transmitted over a wired connection, wirelessly via a suitable wireless communication protocol (e.g., Bluetooth), over a local network, over the Internet, etc. Furthermore, in some examples, the transmission of the first ambient lighting-agnostic digital image and the receipt of the second ambient lighting-agnostic digital image are performed by a live video communication application of the first computing device, allowing the first and second devices to exchange live video of their surroundings. However, digital imagery may be exchanged between two devices in any suitable context.

Returning again to FIG. 2, at 212, method 200 includes, based on the ambient lighting conditions of the first real-world environment, generating a lighting-corrected digital image from the second ambient lighting-agnostic digital image using a display-side ambient lighting color conversion. In other words, various image processing techniques and algorithms may be used to adjust how colors appear in the lighting-corrected digital image to account for the lighting conditions under which the image is displayed. Additional details regarding ambient lighting color conversions are provided below with respect to FIGS. 6 and 7.

In some examples, the display-side ambient lighting color conversion is configured to convert colors of the second ambient lighting-agnostic digital image to preserve perceptual color accuracy of the second real-world environment under the ambient lighting conditions of the first real-world environment. For example, if the ambient lighting conditions of the real-world environment are relatively warm, then the display-side ambient lighting color conversion may convert the image colors to appear relatively cooler, such that the colors are perceived as being neutral under the warm lighting. The display-side ambient lighting color conversion may in some cases use a human perceptual model to account for how pixels of the digital image will be perceived by a human observer's visual system.

Generation of the lighting-corrected digital image is schematically illustrated in FIG. 3. As shown, once second ambient lighting-agnostic digital image 304B is received from second computing device 100B, first computing device 100A uses a display-side ambient lighting color conversion SA3 to generate a lighting-corrected digital image 306A. Similarly, second computing device 100B uses a display-side ambient lighting color conversion SB3 to generate a lighting-corrected digital image 306B from first ambient lighting-agnostic digital image 304B. In FIG. 3, and elsewhere herein, lighting-corrected digital images are shown with a dot fill pattern to distinguish them from first/second digital images 302A/302B and ambient lighting-agnostic digital images 304A/304B.

Returning briefly to FIG. 2, at 214, method 200 includes displaying the lighting-corrected digital image on the first computing device. Depending on the specific display hardware of the first computing device, display-specific color calibration may be performed in tandem with or as a component of the display-side ambient lighting color conversion, or otherwise prior to display of the lighting-corrected digital image. Such display-specific color calibration may be performed in any suitable way and include, for example, adapting display performance based on local ambient lighting conditions and a preset adaptation strength.

Depending on the specific lighting conversions performed, colors in the displayed lighting-corrected digital image may be perceived by the first user as being similar, if not identical, to how the same colors appear to the second user in the second real-world environment. As discussed above, depending on the specific display hardware involved, display-specific color calibration may be performed. In other words, if the second user takes a picture of an article of clothing and sends it to the first user, the two users may perceive the color of the article of clothing in the same way. Thus, the first user can, for example, provide advice as to whether the color of the clothing is flattering given the second user's complexion. Whereas, without the ambient color conversion described herein, there would be uncertainty as to whether both users are truly seeing the same color.

Figure 4:
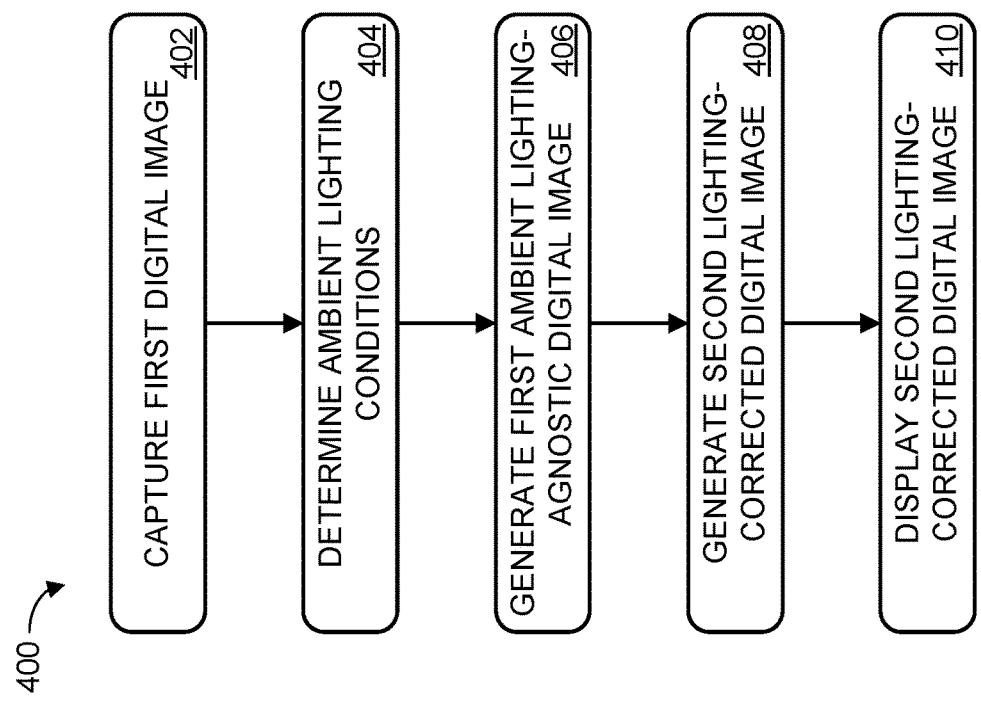
FIG. 4 illustrates an example method for digital image color conversion for a second lighting-corrected digital image.
Figure 4:
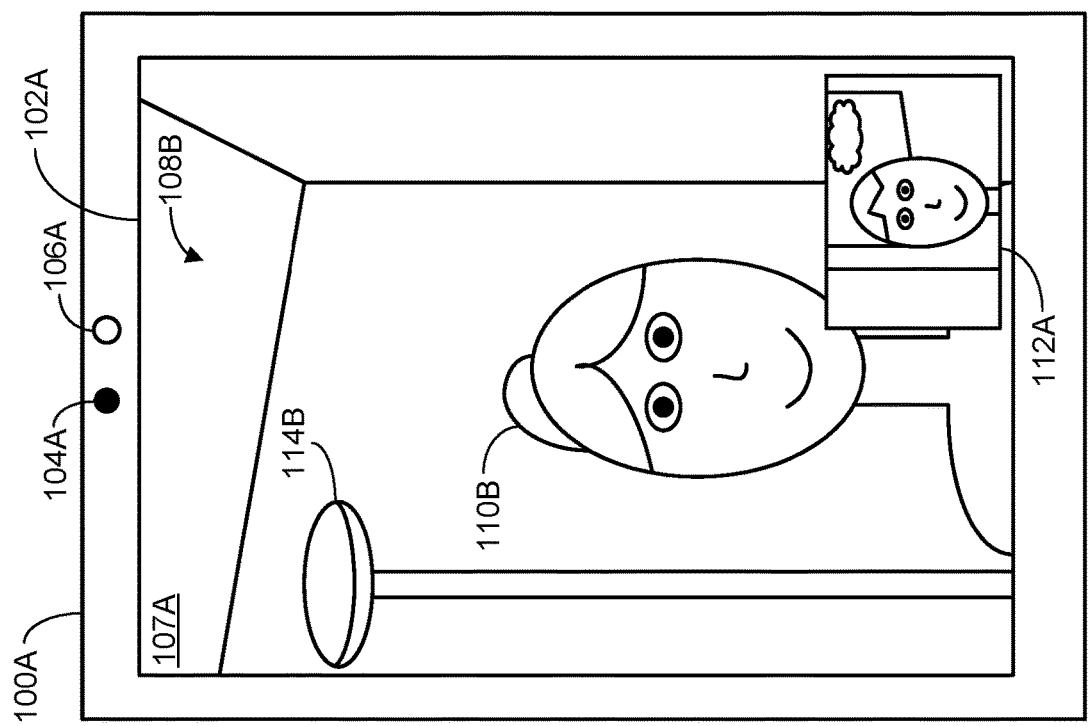

Turning now to FIG. 4, in some cases, a computing device may apply digital image color conversion to an image captured by the device itself. FIG. 4 reproduces computing device 100A from FIG. 1, still displaying images 107A and 112A. As discussed above, image 107A is received from a second computing device and depicts a second real-world environment. However, image 112A is captured by computing device 100A and depicts the first real-world environment of device 100A. In some cases, digital image color conversion may be applied to image 112A prior to its display on display 102A.

Accordingly, FIG. 4 also illustrates an example method 400 for digital image color conversion. At 402, method 400 includes capturing a digital image. At 404, method 400 includes determining ambient lighting conditions of the real-world environment of the computing device. At 406, method 400 includes generating a first ambient lighting-agnostic digital image from the digital image using a capture-side ambient lighting color conversion. These steps may be performed in substantially the same manner as described above with respect to FIG. 2. In other words, the computing device captures a digital image of its own environment and generates a first ambient lighting-agnostic digital image based on the ambient lighting conditions of the device's own environment. The first ambient lighting-agnostic digital image may be transmitted to a second computing device, while a second ambient lighting-agnostic digital image depicting a second real-world environment is received in return. A first lighting-corrected digital image may then be generated from the second ambient lighting-agnostic digital image and displayed by computing device 100A as image 107A.

However, at 408, method 400 includes generating a second lighting-corrected digital image from the first ambient lighting-agnostic digital image via the display-side ambient lighting color conversion. In other words, the device performs the display-side ambient lighting color conversion on the same ambient lighting-agnostic digital image that it generated via the capture-side ambient lighting color conversion, and that depicts the first real-world environment. Thus, the device generates an ambient lighting-corrected digital image that depicts its own environment, and which is modified to account for the ambient lighting conditions in the device's own environment.

At 410, method 400 includes displaying the second lighting-corrected digital image on the computing device, for example as image 112A. This may ensure that the image of the user's local environment visible on the display appears to visually match the colors the user actually experiences in his or her local environment. This stands in contrast to traditional auto white balance and other similar image processing techniques, in which the colors in the image may be perceived differently from the colors visible in the real-world environment. As discussed above, the second lighting-corrected digital image may be presented on a display employing display-specific color calibration.

Figure 5:
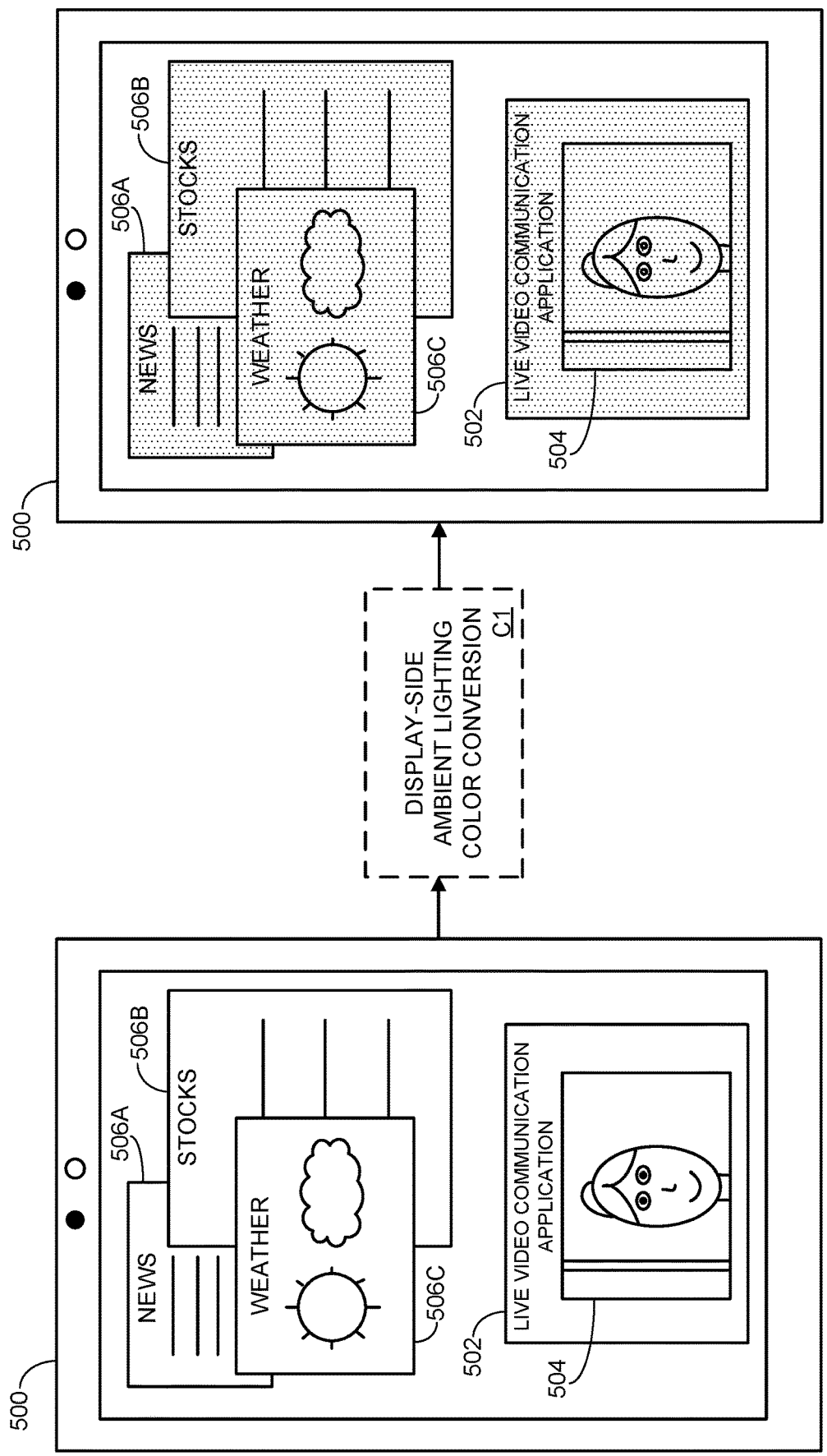
FIG. 5 schematically illustrates color conversion for interface colors of user interface elements.

Thus far, the description of digital image color conversion has focused on its application to digital images captured by a camera. However, the digital image color conversion techniques described herein may additionally, or alternatively, be applied to user interface elements displayed by a computing device. For example, FIG. 5 shows another example computing device 500 rendering various user interface elements on its display. This includes a live video communication application 502, which in turn includes a digital image 504. Also pictured are interface elements 506A, a news application, 506B, a stocks application, and 506C, a weather application.

As discussed above, ambient lighting conditions of an environment in which digital images are viewed can affect how colors of the digital images are perceived. For example, a white image displayed in an environment with relatively warm lighting may be "polluted" by the ambient lighting, and thus be perceived as relatively warmer than the actual pixel values of the image would indicate. The colors of user interface elements may be affected by this in much the same way as digital images captured by a camera.

Accordingly, a computing device may be configured to perform a display-side ambient lighting color conversion on displayed user interface elements in addition to, or instead of, applying the color conversion to a digital image. In FIG. 5, computing device 500 displays a lighting-corrected digital image 504 as part of a user interface including multiple user interface elements, as discussed above. The user interface may be rendered and presented on a color-calibrated display. Though not visible in FIG. 5, each of these user interface elements may have predefined interface element colors (e.g., as specified by a software application's programming), and the perception of such colors may be affected by local ambient lighting. Thus, in FIG. 5, a display-side ambient lighting color conversion C1 is used to convert the interface element colors to lighting-corrected interface element colors based on local ambient lighting conditions. Lighting-corrected interface elements are shown with a dot fill pattern.

In FIG. 5, the display-side ambient lighting color conversion is applied to all elements of the user interface. In other words, substantially all pixels rendered by computing device 500 may be affected by the digital image color conversion. However, in some cases, digital image color conversion may be applied to less than all pixels/UI elements rendered by the computing device. For example, the display-side ambient lighting color conversion may be applied on a per application basis, meaning some application content is rendered without regard to local ambient lighting.

On a technical level, the display-side ambient lighting color conversion will typically involve modifying the RGB values of pixels displayed by the device. In some scenarios, this may be done via software through GPU shader computation, in which case performing the display-side ambient lighting color conversion will typically consume additional processor cycles of the computing device, which has ramifications for device performance and electrical power consumption. Additionally or alternatively, aspects of the display-side ambient lighting color conversion may be integrated into the hardware display pipeline (e.g., along with the display-specific color calibration described above).

In any event, modifications to pixel RGB values can also affect relative brightness of an image. For example, when an image is adapted for display in a relatively cool environment, the color profile of the image may be shifted to appear relatively warmer. However, this can also cause the image to appear relatively darker, and therefore harder to see. In response, the computing device may increase a luminance of the image by increasing an intensity of a hardware display backlight, although this also will consume additional electrical power. Depending on a device's specific configuration, an increase in electrical power consumption can be detrimental to device performance, such as when the device is running on battery power. Accordingly, display-side ambient lighting color conversion may optionally be discontinued based on a battery charge level of the computing device falling below a threshold. In some cases, this threshold may be 100%, meaning digital image color conversion is only performed when the device is plugged in. Additionally, or alternatively, the battery charge threshold may be user-specified.

Figure 6:
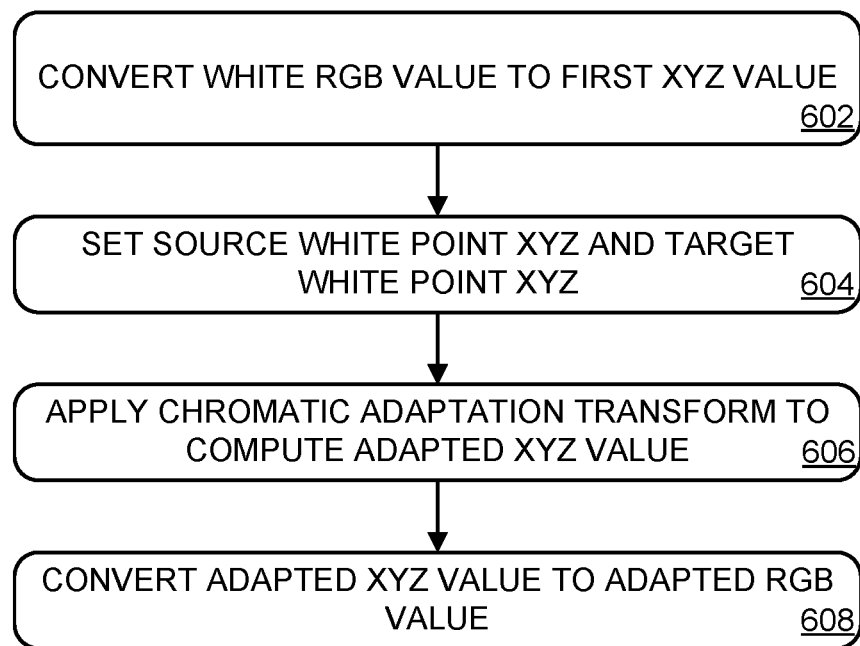
FIG. 6 illustrates an example method for display-side ambient lighting color conversions.

As discussed above, the specific technical details associated with the capture-side and display-side ambient lighting color conversions may vary from implementation to implementation. Nonetheless, FIG. 6 illustrates an example method 600 for digital image color conversion that may be used in accordance with the display-side conversion. As with other methods described herein, method 600 may be implemented on any suitable computer hardware, including any of the computing devices described above, computing system 1000 described below with respect to FIG. 10, and/or another suitable system.

Pixel values of a digital image are typically defined with respect to a particular color space. A variety of standardized color spaces exist, each having particular suitability for different applications. With regard to digital cameras and computer displays, use of the Adobe RGB and sRGB color spaces is common. These color spaces define a finite set of perceivable colors, with each distinct color being defined by numerical values—e.g., distinct red, green, and blue values, or a tuple of numbers that can be mapped to a chromaticity diagram.

When a computing device is used to capture a digital image, colors in the image will be defined with respect to a color space used by the device, and which may be chosen based on hardware properties of the device camera and/or display. Typically, however, white-balanced colors need to be converted from device RGB space to XYZ tristimulus space so that subsequent computations can be performed. Accordingly, at 604, method 600 includes converting an RGB value of white associated with the color space used by the digital image (e.g., [255, 255, 255] or [1, 1, 1]) to a first XYZ value.

In digital imaging, a white point is the tristimulus values or chromaticity coordinates defining the color "white" under particular lighting. Thus, it is desirable that images taken under different lighting conditions have different white points. For example, a white object imaged under relatively warm incandescent lighting (e.g., a color temperature of 3000K) will have a different appearance from the same white object imaged under daylight conditions (e.g., 6500K). Thus, different white point targets are used for images having different lighting conditions, such that the object appears as white in both images. The first XYZ value calculated above may be defined with respect to a source white point of a digital image, which may be a white point automatically selected by image processing software (e.g., based on image statistics) or applied by the capture process when the digital image was captured.

Accordingly, at 606, method 600 includes setting the source white point for the image as an XYZ value, and setting the target white point for the image as another XYZ value. The source white point may be inferred from ambient lighting conditions, potentially reported from an ambient color sensor as described above. In an example scenario, the source white point may be 3000K (i.e., warm lighting), while the target white point is 6500K (i.e., daylight conditions). In this example, 6500K is the predefined lighting condition referenced above with respect to the ambient lighting-agnostic digital image.

At 608, method 600 includes applying a chromatic adaptation transform to convert the first white XYZ value of the digital image to an adapted XYZ value having the target white point. As discussed above, the first white XYZ value of the digital image is defined with respect to the source white point. Thus, the chromatic adaptation transform has the effect of converting the first white XYZ value, which defines the perceptual value of white under the source lighting conditions, to the second white XYZ value defining the perceptual value of white under the target lighting conditions.

The specifics of the chromatic adaptation transform will depend on which color appearance model is used. As examples, chromatic adaptation transforms particular to the CIECAM02, iCAM06, and Bradford color appearance models may be used. In a specific scenario, the chromatic adaptation transform may include setting a 3×3 chromatic adaptation transform matrix matAdapt (e.g., specified by the iCAM image appearance model). Next, [3×1] spectrally sharpened RGB responses are calculated from the first white XYZ value. As an example, the matrix matAdapt may be applied to the first white XYZ value (XYZin), as well as the source and target white point XYZ values (whiteSrc and whiteDest) to give RGB white points:

RGBin=matAdapt*$XYZ$in

RGB_whiteSrc=matAdapt*whiteSrc

RGB_whiteDest=matAdapt*whiteDest

Next, the chromatic adaption transform may include computing a degree of adaptation based on a specified adaptation strength, ambient lighting surround factors, and ambient lighting luminance factors. The degree of adaptation degAdapt may be expressed in any suitable way—e.g., as a value between zero and one. An adapted white RGB value is computed based on the first white XYZ value, source and target RGB white points, and degree of adaptation:

adaptedRGB[$ii$]=(degAdapt*RGB_whiteDest[$ii$]/RGB_whiteSrc[$ii$]+1−degAdapt)*RGBin[$ii$], where $0 \leq ii \leq 2$.

Finally, an adapted white XYZ XYZ adapt value may be calculated from the adapted white RGB value:

XYZ_adapt=inv(matAdapt)*adaptedRGB

At 610, method 600 includes converting the adapted XYZ value to an adapted RGB value for a desired output color space for a device display (e.g., sRGB). Based on the adapted RGB value, the ambient lighting-corrected digital image may be generated. This may include, for example, modifying pixels of the digital image to account for the new lighting-adapted RGB white value calculated above, such that the ambient lighting-corrected digital image has adapted RGB color values. Furthermore, when applied in the context of the display-side ambient lighting color conversion, the adapted XYZ color value may be used as a target white point for display-specific color calibration. This may serve to tune the physical display hardware of the device to render the lighting-corrected digital image in a perceptually accurate manner.

Figure 7:
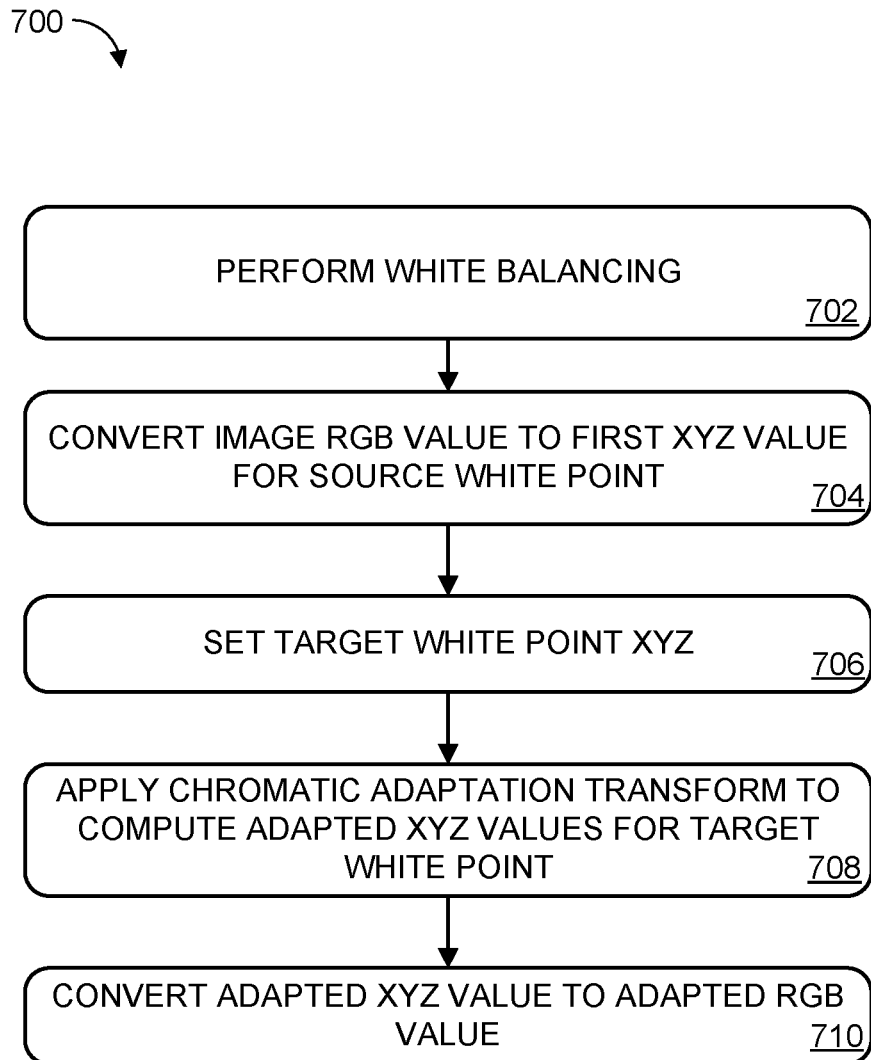
FIG. 7 illustrates an example method for capture-side ambient lighting color conversions.

FIG. 7 illustrates an example method 700 for a capture-side ambient lighting color conversion. As with other methods described herein, method 700 may be implemented on any suitable computer hardware, including any of the computing devices described above, computing system 1000 described below with respect to FIG. 10, and/or another suitable system.

At 702, method 700 includes performing white-balancing on a captured digital image. Performing white balancing includes first estimating the ambient lighting conditions of an environment (e.g., via an ambient color sensor as described above), or estimating an ambient white point of the captured scene, and applying white balance channel gains to color channels of the captured image. Because a goal of the capture-side ambient lighting color conversion is to achieve perceptual color accuracy, the white balancing step of method 700 is done so as to estimate ambient lighting conditions in the environment as accurately as possible. Unlike conventional approaches to camera tuning, method 700 does not incorporate subjective user preferences. Following white balance, neutral colors in the image appear neutral.

Continuing with method 700, at 704, white-balanced device RGB values are converted to XYZ values based on the source white point, for example, a color temperature of 5000K (D50). At 706, method 700 includes setting the target white point for the image as an XYZ value, for example D65. As before, at 708, method 700 includes applying a chromatic adaptation transform to convert the XYZ values of the digital image to an adapted XYZ value having the target white point. At 710, method 700 includes converting the adapted XYZ value to an adapted RGB value for a desired output color space for a device camera (e.g., sRGB). Based on the adapted RGB value, the ambient lighting-agnostic digital image may be generated.

The above description of digital image color conversion focused on a scenario in which each of two computing devices are responsible for some aspect of the image processing. In other words, the capture-side ambient lighting color conversion is performed on a first computing device that actually captures the digital image, while the display-side ambient lighting color conversion is performed on a second computing device on which the image is displayed. However, such processing may be distributed between any number of devices, including only one device.

Figure 8:
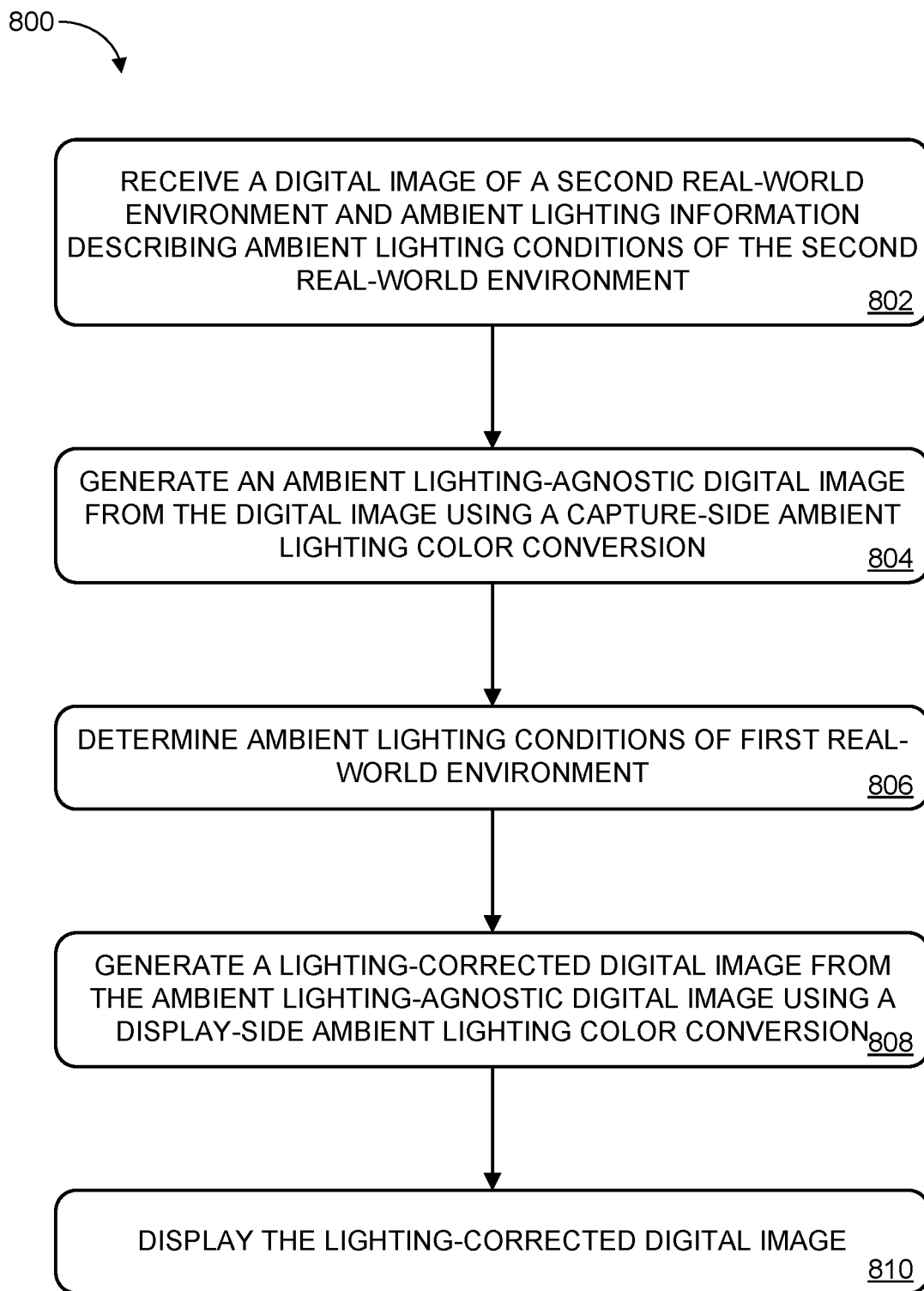
FIG. 8 illustrates an example method for digital image color conversion.

FIG. 8 illustrates another example method 800 for digital image color conversion in which a single device performs both the capture-side and display-side ambient lighting color conversions for a digital image received from an external source. FIG. 8 may be implemented on any suitable computer hardware, including any of the computing devices described above, computing system 1000 described below with respect to FIG. 10, and/or another suitable system. For the sake of this description, method 800 will be assumed to be performed by a first computing device present in a first real-world environment.

At 802, method 800 includes receiving a digital image of a second real-world environment and ambient lighting information describing ambient lighting conditions of the second real-world environment. As discussed above, network communication between two computing devices may be done in any suitable way. With regard to FIG. 8, the received digital image has not undergone a capture-side ambient lighting color conversion. In other words, the received digital image may be described as an original captured image. Depending on the specifics of the imaging hardware used to capture the digital image, white balance and/or other image processing may or may not be applied prior to transmission.

The ambient lighting information may take any suitable form, and may depend on the hardware capabilities of the device used to capture the digital image. When available, an ambient color sensor, such as sensors 106A/106B shown in FIG. 1, may be used to quantify the ambient lighting conditions in the second real-world environment, for example as a color temperature measured in degrees Kelvin. In other examples, the ambient lighting conditions of the second real-world environment may be inferred from pixel values of the image itself, either by the second computing device prior to sending, or by the first computing device after receiving the digital image. In other words, the ambient lighting information may be included within the digital image itself, either via the image pixel values, as attached metadata, as a separate file, etc.

Continuing with FIG. 8, at 804, method 800 includes, based on the ambient lighting conditions of the second real-world environment, generating an ambient lighting-agnostic digital image from the digital image using the capture-side ambient lighting color conversion. Notably, in this case, the capture-side ambient lighting color conversion is performed by a device that did not actually capture the digital image. Regardless, the term "capture-side ambient lighting color conversion" still refers to some combination of algorithms and digital image processing techniques used to generate an ambient lighting-agnostic digital image. Such a conversion may be performed on any suitable computing device provided sufficient information regarding the ambient lighting conditions of the second real-world environment is available.

At 806, method 800 includes determining ambient lighting conditions of the first real-world environment. At 808, method 800 includes, based on the ambient lighting conditions of the first real-world environment, generating a lighting-corrected digital image from the ambient lighting-agnostic digital image using the display-side ambient lighting color conversion. At 810, method 800 includes displaying the lighting-corrected digital image. The lighting-corrected digital image may be displayed on a color calibrated display, as discussed above. These steps may be performed substantially as described above with respect to FIG. 2.

Figure 9:
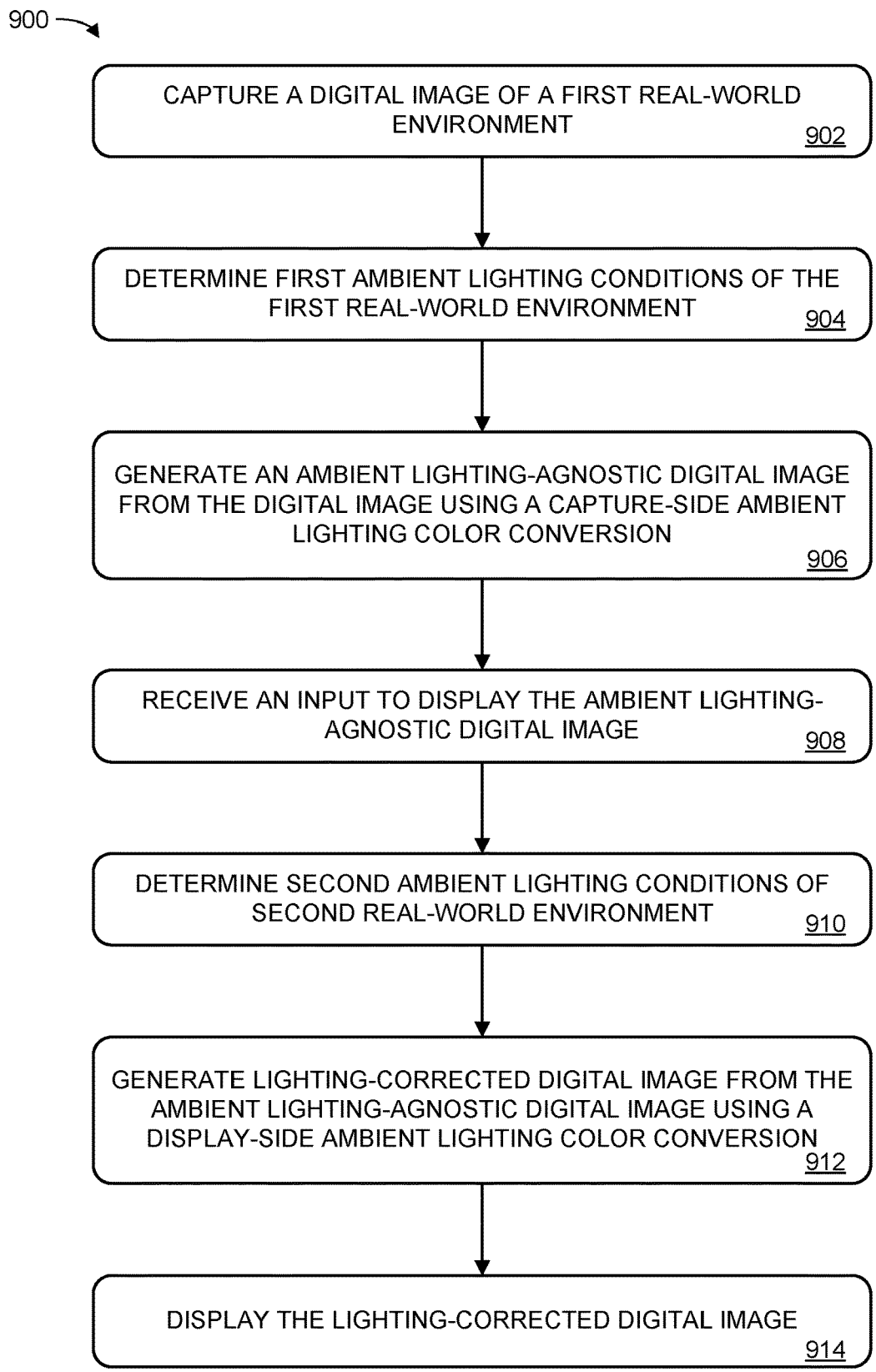
FIG. 9 illustrates another example method for digital image color conversion.

The above description of digital image color conversion generally focused on a scenario in which two computing devices are exchanging digital images over a network, for example as part of a live video call. However, the described techniques may additionally or alternatively be performed on a single device. FIG. 9 illustrates another example method 900 for digital image color conversion in which a single device captures a digital image in a first real-world environment and displays the digital image in a second real-world environment. Method 900 may be implemented on any suitable computer hardware, including any of the computing devices described above, computing system 1000 described below with respect to FIG. 10, and/or another suitable system.

At 902, method 900 includes capturing a digital image of a first real-world environment. At 904, method 900 includes determining first ambient lighting conditions of the first real-world environment. At 906, method 900 includes, based on the first ambient lighting conditions, generating an ambient lighting-agnostic digital image from the digital image using the capture-side ambient lighting color conversion. These steps may be performed substantially as described above with respect to FIG. 2.

However, in contrast to method 200, the ambient lighting-agnostic digital image is not transmitted to a second computing device, nor is a second ambient lighting-agnostic digital image received. Rather, the ambient lighting-agnostic digital image is stored on the computing device for later display. The ambient lighting-agnostic digital image may be stored in addition to the original digital image, meaning the digital image is preserved, or the ambient lighting-agnostic digital image may replace the original captured image.

At 908, method 900 includes receiving an input to display the ambient lighting-agnostic digital image. Notably, this input may be received while the computing device is in a second real-world environment having second ambient lighting conditions. Alternatively, the computing device may remain in the first real-world environment, though ambient lighting conditions have changed (e.g., because lighting sources were turned on/turned off or a time-of-day has changed). Regardless, when the input is received, ambient lighting conditions are now different.

The received input may take any suitable form. For example, a user may select the image from a photo gallery or other software application for display. Alternatively, the image may be automatically displayed by one or more software applications in response to application programming or one or more external factors. For example, the digital image may be saved as the contact photo for a specific contact on a communications device. Because contact photos are typically displayed in tandem with a new communication from their associated contact, the input to display the image may take the form of a new call or communication from a particular contact.

At 910, method 900 includes determining second ambient lighting conditions of the second real-world environment. At 912, method 900 includes, based on the second ambient lighting conditions, generating a lighting-corrected digital image from the ambient lighting-agnostic digital image using the display-side ambient lighting color conversion. At 914, method 900 includes displaying the lighting-corrected digital image. Once again, these steps may be performed substantially the same as described above with respect to FIG. 2. For example, the lighting-corrected digital image may be presented on a color calibrated display. However, notably, in this case the display-side ambient lighting color conversion is performed by the same device that captured the digital image.

The version of the digital image that is stored long-term by the computing device may vary from implementation to implementation. As discussed above, the ambient lighting-agnostic digital image may replace the original captured image, or both images may be retained. Similarly, though the lighting-corrected digital image will generally be the image displayed to the user, the lighting-corrected digital image may or may not be stored long-term. For example, the ambient lighting-agnostic digital image may remain stored on the computing device even as the lighting-corrected digital image is displayed. When the lighting-corrected digital image is no longer displayed, it may optionally remain in storage on the computing device. Alternatively, given that the lighting-corrected digital image may not be appropriate for other ambient lighting conditions the computing device is likely to experience, the lighting-corrected digital image may be discarded, and/or replaced each time an input to display the digital image is received. Further still, the lighting-corrected digital image may replace the ambient lighting-agnostic digital image. In some cases, the computing device may be configured to display the ambient lighting-agnostic digital image as opposed to the lighting-corrected digital image under some circumstances, for example upon user request.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
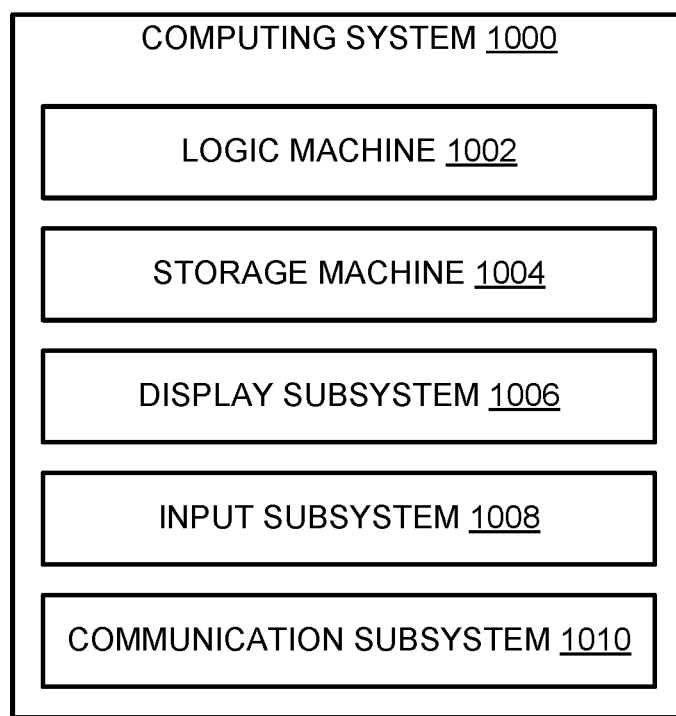
FIG. 10 schematically shows an example computing system.

FIG. 10 schematically shows a non-limiting embodiment of a computing system 1000 that can enact one or more of the methods and processes described above. Computing system 1000 is shown in simplified form. Computing system 1000 may take the form of one or more personal computers, server computers, tablet computers, home-entertainment computers, network computing devices, gaming devices, mobile computing devices, mobile communication devices (e.g., smart phone), and/or other computing devices.

Computing system 1000 includes a logic machine 1002 and a storage machine 1004. Computing system 1000 may optionally include a display subsystem 1006, input subsystem 1008, communication subsystem 1010, and/or other components not shown in FIG. 10.

Logic machine 1002 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1004 includes one or more physical devices configured to hold instructions executable by the logic machine to implement the methods and processes described herein. When such methods and processes are implemented, the state of storage machine 1004 may be transformed—e.g., to hold different data.

Storage machine 1004 may include removable and/or built-in devices. Storage machine 1004 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1004 may include volatile, nonvolatile, dynamic, static, read/write, read-only, random-access, sequential-access, location-addressable, file-addressable, and/or content-addressable devices.

It will be appreciated that storage machine 1004 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1002 and storage machine 1004 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1000 implemented to perform a particular function. In some cases, a module, program, or engine may be instantiated via logic machine 1002 executing instructions held by storage machine 1004. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1006 may be used to present a visual representation of data held by storage machine 1004. This visual representation may take the form of a graphical user interface (GUI). As the herein described methods and processes change the data held by the storage machine, and thus transform the state of the storage machine, the state of display subsystem 1006 may likewise be transformed to visually represent changes in the underlying data. Display subsystem 1006 may include one or more display devices utilizing virtually any type of technology. Such display devices may be combined with logic machine 1002 and/or storage machine 1004 in a shared enclosure, or such display devices may be peripheral display devices.

When included, input subsystem 1008 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1010 may be configured to communicatively couple computing system 1000 with one or more other computing devices. Communication subsystem 1010 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

In an example, a method for digital image color conversion comprises: at a first computing device, capturing a first digital image of a first real-world environment; based on ambient lighting conditions of the first real-world environment, generating a first ambient lighting-agnostic digital image from the first digital image using a capture-side ambient lighting color conversion; transmitting the first ambient lighting-agnostic digital image to a second computing device in a second real-world environment; receiving, from the second computing device, a second ambient lighting-agnostic digital image of the second real-world environment, the second ambient lighting-agnostic digital image having been generated by the second computing device from a second digital image using the capture-side ambient lighting color conversion; based on the ambient lighting conditions of the first real-world environment, generating a lighting-corrected digital image from the second ambient lighting-agnostic digital image using a display-side ambient lighting color conversion; and displaying the lighting-corrected digital image on the first computing device. In this example or any other example, the capture-side ambient lighting color conversion is configured to convert colors of the first digital image to appear as if the first digital image was captured under a predefined lighting condition. In this example or any other example, the predefined lighting condition is an ambient color temperature of 6500K (D65). In this example or any other example, the capture-side ambient lighting conversion includes converting a white RGB color value of the digital image to a first white XYZ tristimulus value having a source white point, applying a chromatic adaptation transform to convert the first white XYZ tristimulus value to an adapted white XYZ tristimulus value having a target white point based on ambient lighting surround and luminance factors, and generating the ambient lighting-agnostic digital image with adapted RGB color values. In this example or any other example, the display-side ambient lighting color conversion is configured to convert colors of the second ambient lighting-agnostic digital image to preserve perceptual color accuracy of the second real-world environment when displayed on a color-calibrated display under the ambient lighting conditions of the first real-world environment. In this example or any other example, the ambient lighting conditions of the first real-world environment are determined using an ambient color sensor of the first computing device. In this example or any other example, the method further comprises, on the first computing device, using the display-side ambient lighting color conversion to generate a second lighting-corrected digital image from the first ambient lighting-agnostic digital image of the first real-world environment, and displaying the second lighting-corrected digital image on the first computing device. In this example or any other example, the transmission of the first ambient lighting-agnostic digital image and the receipt of the second ambient lighting-agnostic digital image are performed by a live video communication application of the first computing device. In this example or any other example, the lighting-corrected digital image is displayed as part of a user interface including one or more user interface elements, each of the one or more user interface elements having predefined interface element colors, and the method further comprises converting the predefined interface element colors to lighting-corrected interface colors using the display-side ambient lighting color conversion based on the ambient lighting conditions of the first real-world environment. In this example or any other example, the method further comprises discontinuing the display-side ambient lighting color conversion based on a battery charge level of the first computing device falling below a threshold. In this example or any other example, the method further comprises: while the first computing device is located in a third real-world environment, receiving an input to display the first ambient lighting-agnostic digital image; based on ambient lighting conditions of the third real-world environment, generating a second lighting-corrected digital image from the first ambient lighting-agnostic digital image using the display-side ambient lighting color conversion; and displaying the second lighting-corrected digital image on the first computing device. In this example or any other example, the first ambient lighting-agnostic digital image is stored on the first computing device even as the second lighting-corrected digital image is displayed.

In an example, a computing device comprises: a logic machine; and a storage machine holding instructions executable by the logic machine to: while the computing device is in a first real-world environment, receive, from a second computing device, a digital image of a second real-world environment; based on ambient lighting conditions of the first real-world environment, generate a lighting-corrected digital image from the digital image using a display-side ambient lighting color conversion; and display the lighting-corrected digital image on a display of the computing device. In this example or any other example, the digital image is an ambient-lighting agnostic digital image generated by the second computing device from an original captured image using a capture-side ambient lighting color conversion. In this example or any other example, the capture-side ambient lighting color conversion is configured to convert colors of the original captured image to appear as if the original captured image was captured under a predefined lighting condition. In this example or any other example, the predefined lighting condition is an ambient color temperature of 6500K (D65). In this example or any other example, the capture-side ambient lighting color conversion includes converting a white RGB color value of the original captured image to a first white XYZ tristimulus value having a source white point, applying a chromatic adaptation transform to convert the first white XYZ tristimulus value to an adapted white XYZ tristimulus value having a target white point based on ambient lighting surround and luminance factors, and generating the ambient lighting-agnostic digital image with adapted RGB color values. In this example or any other example, the instructions are further executable to generate an ambient lighting-agnostic digital image from the digital image using a capture-side ambient lighting color conversion based on ambient lighting information describing ambient lighting conditions of the second real-world environment, and the lighting-corrected digital image is generated from the ambient lighting-agnostic digital image using the display-side ambient lighting color conversion. In this example or any other example, the display-side ambient lighting color conversion is configured to convert colors of the digital image to preserve perceptual color accuracy of the second real-world environment under the ambient lighting conditions of the first real-world environment.

In an example, a method for digital image color conversion comprises: at a computing device in a first real-world environment, receiving a digital image of a second real-world environment and ambient lighting information describing ambient lighting conditions of the second real-world environment; based on the ambient lighting conditions of the second real-world environment, generating an ambient lighting-agnostic digital image from the digital image using a capture-side ambient lighting color conversion; based on ambient lighting conditions of the first real-world environment, generating a lighting-corrected digital image from the ambient lighting-agnostic digital image using a display-side ambient lighting color conversion; and displaying the lighting-corrected digital image on the computing device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for digital image color conversion, comprising:
    at a first computing device, capturing a first digital image of a first real-world environment;
    based on ambient lighting conditions of the first real-world environment, generating a first ambient lighting-agnostic digital image from the first digital image using a capture-side ambient lighting color conversion;
    transmitting the first ambient lighting-agnostic digital image to a second computing device in a second real-world environment;
    receiving, from the second computing device, a second ambient lighting-agnostic digital image of the second real-world environment, the second ambient lighting-agnostic digital image having been generated by the second computing device from a second digital image using the capture-side ambient lighting color conversion;
    based on the ambient lighting conditions of the first real-world environment, generating a lighting-corrected digital image from the second ambient lighting-agnostic digital image using a display-side ambient lighting color conversion; and
    displaying the lighting-corrected digital image on the first computing device.

2. The method of claim 1, where the capture-side ambient lighting color conversion is configured to convert colors of the first digital image to appear as if the first digital image was captured under a predefined lighting condition.

3. The method of claim 2, where the predefined lighting condition is an ambient color temperature of 6500K (D65).

4. The method of claim 2, where the capture-side ambient lighting conversion includes converting a white RGB color value of the digital image to a first white XYZ tristimulus value having a source white point, applying a chromatic adaptation transform to convert the first white XYZ tristimulus value to an adapted white XYZ tristimulus value having a target white point based on ambient lighting surround and luminance factors, and generating the ambient lighting-agnostic digital image with adapted RGB color values.

5. The method of claim 1, where the display-side ambient lighting color conversion is configured to convert colors of the second ambient lighting-agnostic digital image to preserve perceptual color accuracy of the second real-world environment when displayed on a color-calibrated display under the ambient lighting conditions of the first real-world environment.

6. The method of claim 1, where the ambient lighting conditions of the first real-world environment are determined using an ambient color sensor of the first computing device.

7. The method of claim 1, further comprising, on the first computing device, using the display-side ambient lighting color conversion to generate a second lighting-corrected digital image from the first ambient lighting-agnostic digital image of the first real-world environment, and displaying the second lighting-corrected digital image on the first computing device.

8. The method of claim 1, where the transmission of the first ambient lighting-agnostic digital image and the receipt of the second ambient lighting-agnostic digital image are performed by a live video communication application of the first computing device.

9. The method of claim 1, where the lighting-corrected digital image is displayed as part of a user interface including one or more user interface elements, each of the one or more user interface elements having predefined interface element colors, and the method further comprises converting the predefined interface element colors to lighting-corrected interface colors using the display-side ambient lighting color conversion based on the ambient lighting conditions of the first real-world environment.

10. The method of claim 1, further comprising discontinuing the display-side ambient lighting color conversion based on a battery charge level of the first computing device falling below a threshold.

11. The method of claim 1, further comprising:
while the first computing device is located in a third real-world environment, receiving an input to display the first ambient lighting-agnostic digital image;
based on ambient lighting conditions of the third real-world environment, generating a second lighting-corrected digital image from the first ambient lighting-agnostic digital image using the display-side ambient lighting color conversion; and
displaying the second lighting-corrected digital image on the first computing device.

12. The method of claim 11, where the first ambient lighting-agnostic digital image is stored on the first computing device even as the second lighting-corrected digital image is displayed.

13. A computing device, comprising:
a logic machine; and
a storage machine holding instructions executable by the logic machine to:
while the computing device is in a first real-world environment, receive, from a second computing device, a digital image of a second real-world environment;
based on ambient lighting information describing ambient lighting conditions of the second real-world environment, generate an ambient lighting-agnostic digital image from the digital image using a capture-side ambient lighting color conversion;
based on an ambient lighting color temperature of the first real-world environment, generate a lighting-corrected digital image from the ambient lighting-agnostic digital image using a display-side ambient lighting color conversion; and
display the lighting-corrected digital image on a display of the computing device.

14. The computing device of claim 13, where the capture-side ambient lighting color conversion is configured to convert colors of the digital image to appear as if the digital image was captured under a predefined lighting condition.

15. The computing device of claim 14, where the predefined lighting condition is an ambient color temperature of 6500K (D65).

16. The computing device of claim 14, where the capture-side ambient lighting color conversion includes converting a white RGB color value of the digital image to a first white XYZ tristimulus value having a source white point, applying a chromatic adaptation transform to convert the first white XYZ tristimulus value to an adapted white XYZ tristimulus value having a target white point based on ambient lighting surround and luminance factors, and generating the ambient lighting-agnostic digital image with adapted RGB color values.

17. The computing device of claim 13, where the display-side ambient lighting color conversion is configured to convert colors of the ambient lighting-agnostic digital image to preserve perceptual color accuracy of the second real-world environment under the ambient lighting color temperature of the first real-world environment.

18. A method for digital image color conversion, comprising:
at a computing device in a first real-world environment, receiving a digital image of a second real-world environment and ambient lighting information describing ambient lighting conditions of the second real-world environment;
based on the ambient lighting conditions of the second real-world environment, generating an ambient lighting-agnostic digital image from the digital image using a capture-side ambient lighting color conversion;
based on ambient lighting conditions of the first real-world environment, generating a lighting-corrected digital image from the ambient lighting-agnostic digital image using a display-side ambient lighting color conversion; and
displaying the lighting-corrected digital image on the computing device.

19. The computing device of claim 13, where the ambient lighting color temperature of the first real-world environment is determined using an ambient color sensor of the computing device.

20. The computing device of claim 13, where the instructions are further executable to discontinue the display-side ambient lighting color conversion based on a battery charge level of the computing device falling below a threshold.

* * * * *